United States Patent [19]

Huang et al.

[11] Patent Number: 4,516,238
[45] Date of Patent: May 7, 1985

[54] SELF-ROUTING SWITCHING NETWORK

[75] Inventors: Alan Huang, Ocean; Scott C. Knauer, Englishtown, both of N.J.

[73] Assignee: AT&T Bell Laboratories, Murray Hill, N.J.

[21] Appl. No.: 479,668

[22] Filed: Mar. 28, 1983

[51] Int. Cl.³ ............................................. H04Q 11/04
[52] U.S. Cl. ......................................... 370/60; 370/94
[58] Field of Search ............................ 370/60, 94, 56; 340/825.5, 825.51

[56] References Cited

U.S. PATENT DOCUMENTS 3,428,946 2/1969 Batcher ............................ 340/146.2
4,258,434 3/1981 Glowinski et al. ................. 370/60
4,314,367 2/1982 Bakka et al. ....................... 370/60

OTHER PUBLICATIONS

"Switchor: An Asynchronous Time-Division Switch for Data and Digitized Voice" by Flotner et al.; Journal of Digital Systems; vol. VI, No. 1, pp. 29–51, Spring 1982.

Spring Joint Computer Conference Proceedings, 1968 "Sorting Networks and Their Applications", K. E. Batcher, pp. 307–314.

IEEE Transactions on Computers, vol. C–24, No. 12, Dec. 1975, "Access and Alignment of Data in an Array Processor", D. H. Lawrie, pp. 1145–1155.

IEEE Transactions on Computers, vol. C–30, No. 5, May 1981, "A Self-Routing Benes Network and Parallel Permutation Algorithms", D. Nassimi and S. Sahni, pp. 332–340.

Primary Examiner—Douglas W. Olms
Attorney, Agent, or Firm—Henry T. Brendzel

[57] ABSTRACT

Disclosed is a full access, non-blocking, wide band switching network that is self routing. Responsive to input signals having embedded destination addresses, the self routing switching network comprises a conventional self routing sorting network followed by a self routing expander. Incoming signals are ordered, and simultaneously appear at the output of the sorting network in ascending order of destination addresses. The signals incoming to the expander network are also processes simultaneously. The processing consists of relating the intermediate address of the expander network input line at which each signal appears with the destination address of the signal, and steering the signal to the appropriate output line in accordance with said relating.

15 Claims, 15 Drawing Figures

SELF-ROUTING SWITCHING NETWORK

BACKGROUND OF THE INVENTION

1. Field of the Invention

This invention relates to full access, non-blocking, and self-routing switching networks.

2. Description of the Prior Art

Most switching networks contain physical switching elements which are joined by links to effect interconnection of the network's input terminals to the network's output terminals. Switching networks that can connect any specific input terminal to any specific output terminal are called full access switching networks. Full access networks that can make requested connections without regard to the already existing connections between input and output terminals are termed non-blocking.

One of the most well known full access, non-blocking, switching networks is the complete N by N single stage crossbar, where each of N inputs can connect to each of N outputs through a physical switching element, also called a crosspoint. There are $N^2$ crosspoints in such a crossbar switch. Since physical crosspoints have always been relatively expensive, considerable research has been done toward finding topologies that require fewer than $N^2$ crosspoints and yet achieve the desired switching flexibility. Invariably, those topologies contemplate more than a single switching stage.

V. Bene described a novel multistage switching network construction in his classical book entitled "Mathematical Theory of Connecting Networks and Telephone Traffic," Academic Press, New York, 1965. The Bene network, which is derived by successively decomposing a switching network into smaller switching networks, is a multistage network of interconnected 2 by 2 switch elements. The switching elements, having inputs A and B and outputs C and D, assume one of two states: a "pass-through" state, where inputs A and B are connected to outputs C and D, respectively (A→C and B→D); and a "cross" state, where inputs A and B are connected to outputs D and C, respectively (A→D and B→C). Following the Bene lead, other researchers have differently decomposed the N by N switching network and have created other multistage network topologies—each having its own advantages and disadvantages.

Much of the early use of multistage switching networks has been in connection with telecommunications switching. More recently, such networks have been incorporated in many data processing applications, both as switching networks and as parts of the processing units themselves in parallel processing arrangements. In those data processing applications many of the switching networks are of limited flexibility, serving very specific functions such as shuffling or sorting. Sorting is merely the process of rearranging an unordered sequence of numbers to create an ordered sequence of numbers.

Trying to both improve the speed of concurrent I/O operations in computer systems and employ a minimum number of crosspoints, K. E. Batcher devised a useful digital sorting network. Batcher described his multistage network in a paper entitled "Sorting Networks and their Applications," published in a 1968 Spring Joint Computer Conference Proceedings, pp. 307–314 (also, U.S. Pat. No. 3,428,946 issued Feb. 18, 1969). Basically, the Batcher network comprises interconnected 2 by 2 sorting elements which, like the switching elements in the Bene network, assume either the "pass-through" or a "cross" state. The Batcher sorting elements differ from the Bene elements in that the decision of the state to be assumed is made within the sorting elements themselves based on whether a predetermined portion of the digital signal at input A of the sorting element is greater or smaller than a corresponding portion of the digital signal at input B. This characteristic of the sorting elements makes the Batcher network self-routing.

Batcher points out that his self-routing sorting network can be used as a full access switching network because an input can, in effect, specify a connection to a particular output. The specified connections are made, according to Batcher, by numbering the output lines in order and presenting the desired output address at the input, as part of the input signal. The sorting network sorts the addresses and, by that process, makes a connection from each input line to the desired output line.

In similar work on parallel routing networks, D. H. Lawrie described a network that can switch sorted arrays of signals in an article entitled "Access and Alignment of Data in an Array Processor," Transaction on Computers, Vol. C-24, No. 12, December 1975, pp. 1145–1155. The network (which he called the Omega network) employs "pass-through/cross" switch elements similar to the Batcher elements, and the interconnections between stages or rows of the switching elements form a perfect shuffle. The phrase "shuffle" derives from the familiar shuffling of cards, where the upper half of a deck is separated from the lower half of the deck and the cards of the two half decks are interleaved to reconstitute the full deck. The adjective "perfect" denotes the fact that the interleaving is performed by consistently taking one card from each deck, in order.

The network described by Lawrie differs from the Batcher network in that it switches signals to the specific destinations dictated by the signals, rather than simply sorting the signals in ascending order of destination addresses. The Omega network, then, is not truly a sorting network although each element within the network performs a directed routing operation.

Concurrently with expanding research in the use of digital network in the data processing field, the use of digital networks has been growing in the communications field. Such communications networks require, at a minimum, a wide bandwidth transmission medium, an efficient communications technique, and an effective switching network.

One very promising digital communications technique employs packet switching. In a packet switching environment, the information is processed, transmitted and switched in small packets of digital data and each packet contains, inter alia, a destination address. To make full use of the capabilities inherent in packet switching, the switching network in such a communication system must be very fast and, preferably, self-routing.

Being aware of the switching needs of digital communication networks employing packet switching, and being also aware of the attributes of sorting networks, we came to the realization that the implementation of switching through the use of a self-routing sorting network, like the one described by Batcher, is especially well suited for packet switching applications. The suitability comes foremost from the exceptionally good match between the signal format of the packets and the signal format requirement of the self-routing sorting network. Sorting networks are also inherently capable of high operating speed, which is of prime importance in a packet switching environment where the switching network must assume a different state for each successive set of packets. Thus, we realized that self-routing switching networks could be a real boon to packet switching communications networks.

Unfortunately, the Batcher sorting network, like all other sorting networks, has a serious drawback which prevents it from being used as a full access switching network. Specifically, the Batcher network fails to switch properly when there are inactive output ports (i.e., unsought destinations). Since sorting networks merely rearrange the order of the input signals and thus deal only with the positions of signals relative to the positions of other signals, the only time the Batcher network switches properly is when each and every output port is a destination of one and only one input port signal.

The Omega network, although it attempts to make specific connections, is self-routing and non-blocking for a limited set of permutations. It is self-routing and non-blocking when the input is sorted in ascending order (assuming that its outputs are labeled in ascending order), but fails when there are undefined destinations because the algorithm employed by the switching elements requires specific and unique destination addresses. For the same reason and because of interconnection topology, the Omega network also fails when a particular destination is sought by more than one input signal.

SUMMARY OF THE INVENTION

To overcome the above drawbacks in the use of sorting networks as full access switching networks, it is necessary to properly account for unsought destinations and destinations sought by more than one signal, and to thus convert the relative ordering of signals at the sorting network's output to the absolute positions of the desired signal destinations. In accordance with the principles of our invention, this "accounting" is achieved through a number of steps. The appearance of more than one signal seeking a particular destination is remedied with a sorting network followed by a trap network. The sorting network orders signals by destinations and the trap network removes all but one of the signals seeking a particular destination. The occurrence of unsought destinations is remedied with a self-routing expander that simultaneously accounts for the desired absolute position of each of its input signals (i.e., the signal's desired destination) and the signal's intermediate position. The expander computes the required shift for each of its input signals, and simultaneously steers its input signals in accordance with the computations.

In an alternate embodiment of the expander the Omega network is modified to handle unsought destinations and thus modified it is used to switch the signals from the output of the trap network to their proper destinations.

Stating that not all output ports are always active necessarily implies that not all input ports are always active. In fact, in many switching applications essentially all of the input ports are indeed idle for most of the time. An embodiment arranged in accordance with the principles of our invention as described above can handle inactive input ports by causing such inputs to seek connection to a predetermined output port having, for example, the maximum destination address. However, for applications where at any one time many input ports are inactive, our invention is enhanced with a self-routing concentrator network interposed between the input signals and the sorting network. The concentrator groups the signals of the active ports. The concentrator network reduces the necessary size of the self-routing sorting network and, thereby, reduces the delay of the signal flow through the network and the overall cost.

DETAILED DESCRIPTION

System Overview

Figure 1:
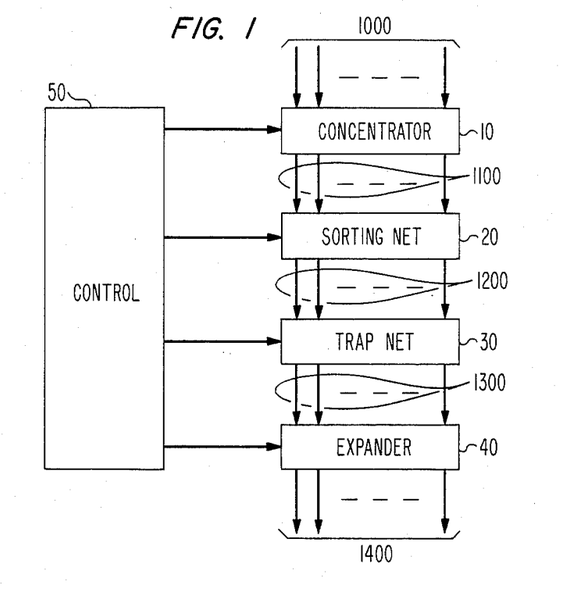
FIG. 1 depicts a block diagram of a switching network illustrating the principles of our invention.

FIG. 1 presents the block diagram of a switching network illustrative of the principles of our invention. Designed to switch signals that have destination addresses associated with the flowing signals, the system of FIG. 1 comprises a concentrator 10, a self-routing sorting network 20, a trap network 30 which is not necessary when there is no plurality of signals seeking the same output, a self-routing expander 40, and a control block 50.

To illustrate the principles of our invention, the FIG. 1 switching network embodiment described below is adapted to operate with a data stream composed of signal packets which contain a header field and a data field. The header field contains an activity bit (indicating whether the packet contains a valid signal—"0"—, or no signal—"1") and an address field including a destination address subfield and possibly additional subfields, with the most significant bit residing in first bit position of the subfield. Variations of this format are, of course, possible without departing from the principles of our invention. It may be pointed out that inactivity, being that it is denoted by a "1" in the activity bit, permits any and all signal patterns in all other bits. This includes all 1's, which can be generated by simply connecting an inactive input to the high state. Although inactive lines set at the high state are not packets of information, for sake of simplicity the specification refers to "inactive packets" emanating from inactive lines.

Incoming signals are applied to the switching network of FIG. 1 on input lines 1000 and therefrom signals are applied to concentrator 10 where the active packets are routed to appear adjacent to each other at concentrator 10 output lines 1100. The signals on lines 1100 are applied to sorting network 20, where the active packets are sorted based on the destination addresses of the packets. Trap network 30 detects the instances where more than one signal packet at the output of sorting network 20 (lines 1200) seek connection to a particular destination and deactivates all but one of such signal packets. Expander 40 operates on the output signals of trap network 30 (lines 1300) simultaneously. Viewing the input lines at which the signals arrive as intermediate addresses, expander 40 in one implementation compares the intermediate addresses to the ultimate destinations (addresses) that the packets seek and, based on the comparisons, routes the packets to their proper destinations at output lines 1400. In another implementation expander 40 simply inspects the destination addresses to determine its routing. Block 50 provides the necessary control signals to concentrator 10, sorting network 20, trap network 30, and expander 40.

Concentrator Network 10

At the outset we would like to point out that the system of FIG. 1 is fully functional even without concentrator 10. However, in applications where the number of potential users of the network is large but the number of active users at any one time is small, the FIG. 1 system without concentrator 10 is not as efficient as possible. The inefficiency is rooted in the fact that to accommodate a large number of potential users, sorting network 20 would have a large number of input lines 1100 and attendant circuits, and most of them would not be actively utilized. Although network 20 can be constructed economically in a manner conducive to modular growth, the number of rows of routing elements within the sorting network and the number of routing elements per row (described in more detail in connection with FIG. 5) increases with input lines 1100, and so does the cost.

Since applications where only a small number of potential users is active at any one time are very common in telecommunications we expect concentrator 10 to be employed more often than not.

Figure 2:
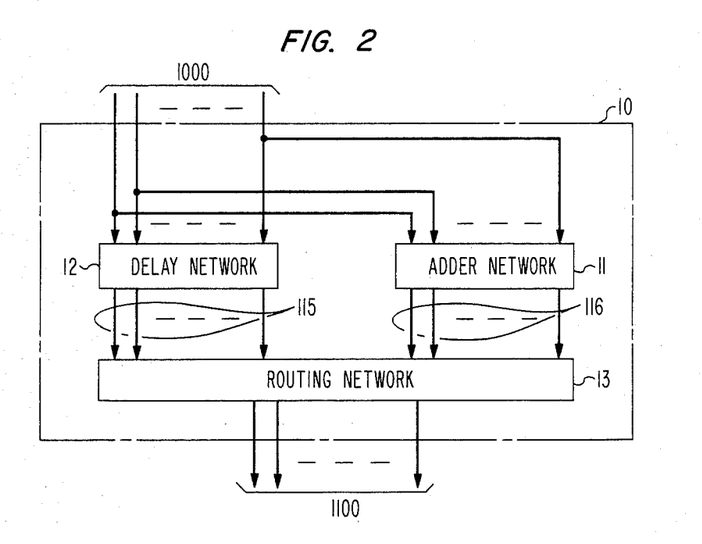
FIG. 2 illustrates an implementation of concentrator 10.

FIG. 2 depicts a schematic diagram of concentrator 10, as disclosed in S. Knauer's copending application entitled "A Self-Routing Steering Network," filed on the even date herewith and incorporated herein.

Functionally, concentrator 10 determines which input lines 1000 are active (i.e. carry active packets) and, based on those determinations, routes the active packets to the left (in FIG. 2) so that all active packets are adjacent to each other at the concentrator's output lines 1100. This is realized in concentrator 10 with an adder network 11 and a delay network 12 that are both responsive to input lines 1000, and a routing network 13 that is responsive to networks 11 and 12.

In one embodiment of concentrator 10, as disclosed by Knauer in the aforementioned application, adder network 11 comprises an array of flip-flops and successive arrays of adder circuits which simultaneously compute for each input line of the concentrator the number of "0" activity bits (active packets) to the left of the input line and, consequently, the necessary steering of the packets on that line. The sum of "0" activity bits is computed for each line by adding (in serial arithmetic) the inverse of the activity bit of the line to the sum computed for the line immediately to the left. The result is a binary shift control signal (least significant bit first) on each adder network output line 116 that is associated with each input line 1000.

Delay network 12 comprises a shift register for each input line 1000. It delays the input signals by an amount equal to the delay incurred by the adder elements in computing the necessary shift control signals.

Figure 3:
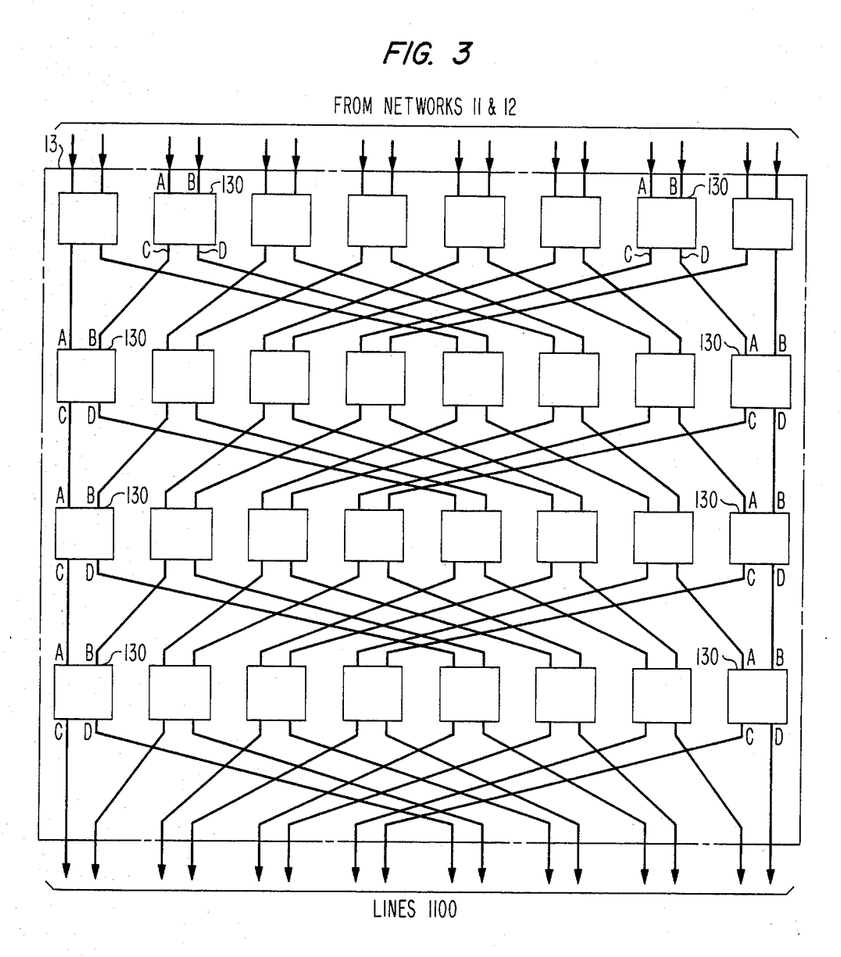
FIG. 3 depicts an illustrative embodiment of routing network 13 in the concentrator of FIG. 2.

Routing network 13 may be implemented in a number of ways. One implementation, which is similar to the Omega network described by Laurie and is shown in FIG. 3, comprises rows of switching elements 130 which are interconnected in a shuffle pattern. FIG. 3 shows the interconnection pattern for a 16 input network. Of course, the number of inputs can be as large as necessary, but this number must be a power of 2 for the Omega network to function properly. FIG. 3 also shows two inputs and two outputs for each switching element 130 but, actually, each shown input and output represents two lines: a signal line whose signals originate at lines 115 of delay network 12, and a control line whose signals originate at lines 116 of adder network 11. The interconnection of elements 130 is very regular. When each input or output in a row of elements 130 is assigned a binary representation (e.g. the left-most input or output is assigned 0000 and the right-most input or output in FIG. 3 is assigned 1111) then an output of element 130 at position $s_1s_2s_3s_4$ is connected to an input of an element 130 in the next row at position $s_4s_1s_2s_3$. For example, output 0110 is connected to input 0011, output 1011 is connected to input 1101, etc.

Figure 4:
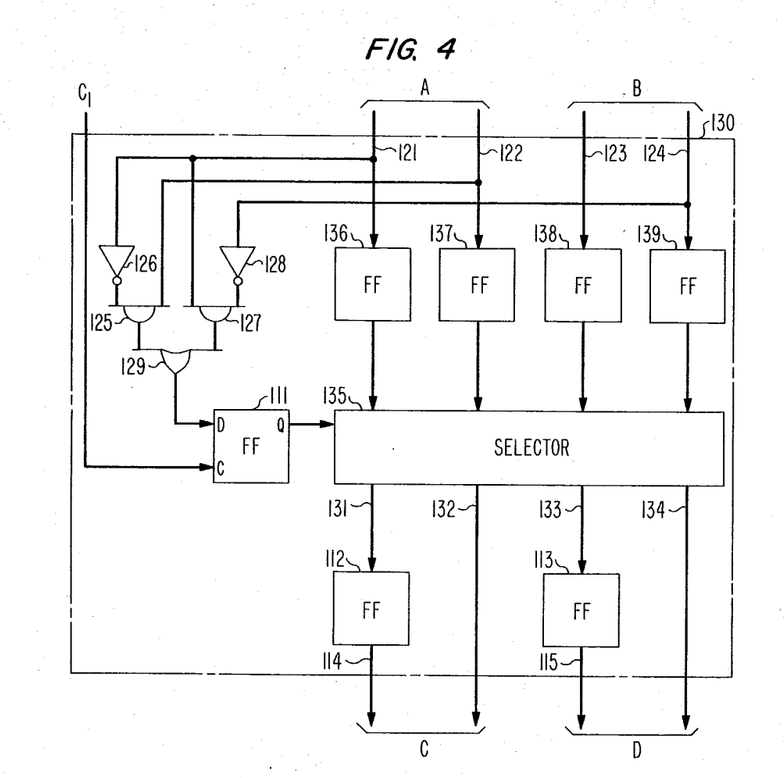
FIG. 4 illustrates an implementation of switching element 130.

Each switching element 130 in the network of FIG. 3, shown as having inputs A and B and outputs C and D, is capable of assuming a "pass through" state or a "cross" state. The state that each switch element 130 assumes is dependent on the activity bits and on specific destination address bits of the signals entering the switch. More specifically, the states of switch elements 130 in the first stage (top stage in FIG. 3) are controlled by the least significant bits of the shift control signals, and elements 130 in each successive stage are controlled by the next higher order bits of the shift control signals. The Truth Table below specifies the state that a switch element 130 assumes in response to its input conditions, and a circuit design implementing this Truth Table is shown in FIG. 4.

| Truth Table | | | | | |
|---|---|---|---|---|---|
| A input activity bit | B input activity bit | A input control word bit | B input control word bit | routing | desired switch position |
| 0 | 0 | 0 | 0 | A→C,B→D | pass |
| 0 | 0 | 0 | 1 | A→C,B→D | pass |
| 0 | 0 | 1 | 0 | A→D,B→C | cross |
| 0 | 0 | 1 | 1 | A→D,B→C | cross |
| 0 | 1 | 0 | 0 | A→C,B→d* | pass |
| 0 | 1 | 0 | 1 | A→C,B→d | pass |
| 0 | 1 | 1 | 0 | A→D,B→d | cross |
| 0 | 1 | 1 | 1 | A→D,B→d | cross |
| 1 | 0 | 0 | 0 | A→d,B→C | cross |
| 1 | 0 | 0 | 1 | A→d,B→D | pass |
| 1 | 0 | 1 | 0 | A→d,B→C | cross |

-continued

| Truth Table | | | | | |
|---|---|---|---|---|---|
| A input activity bit | B input activity bit | A input control word bit | B input control word bit | routing | desired switch position |
| 1 | 0 | 1 | 1 | A→d,B→D | pass |
| 1 | 1 | 0 | 0 | A→d,B→d | d |
| 1 | 1 | 0 | 1 | A→d,B→d | d |
| 1 | 1 | 1 | 0 | A→d,B→d | d |
| 1 | 1 | 1 | 1 | A→d,B→d | d |

*d stands for "don't care" and the design of Fig. 4 can be either a pass position or a cross position Switch element 130, shown in FIG. 4, performs three functions: it detects the activity bits on each data input and the appropriate control bits on each control input, performs the "pass through" or "cross" switching, and advances the shift control word relative to the activity bit. Advancing of the shift control word causes the control bits needed at each row to always coincide with the activity bits as the signals propagate through the rows of network 13. This simplifies the switching and control burdens.

The illustration in FIG. 4 explicitly shows the data and control paths. To wit, lines 121, 123, 114 and 115 are the data lines of leads A, B, C, and D, respectively, and lines 122, 124, 132, and 134 are the control lines of leads A, B, C and D, respectively.

To effect the logic of the above Truth Table, AND gate 125 is connected to line 122 directly and to line 121 through inverter 126. AND gate 127 is connected to line 121 directly and to line 124 through inverter 128. Gates 125 and 127 are connected OR gate 129 which develops a signal for controlling the state of switch 130. This signal is captured in D flip-flop 111 (with the aid of control signal C1 from module 50) and applied to selector 135. Selector 135 is responsive to reclocked replicas of the signals on lines 121 through 124. The reclocking is done in flip-flops 136 through 139. Selector 135 is a conventional dual double-pole/double-throw switch (realized, for example, with AND and OR gates). It establishes either the "pass through" or the "cross" state for switch element 130 and applies its signals to lines 131 through 134. Lines 131 and 132 carry the data and control signals for the C output of the switch and lines 133 and 134 carry the data and control signals for the D output of the switch. Lines 131 and 133 are delayed through flip-flops 112 and 113, respectively, before exiting switch element 130 via lines 114 and 115. This advances the control in relation to the data to insure that the appropriate control bits coincide with the activity bits at the next row of switch elements 130.

Sorting Network 20

Sorting network 20 sorts the packets based on destination addresses. At the output of network 20 the destination of a packet on each output line 1200 is equal to, or is larger than, the destination of the packet on an adjacent output line 1200 on one side; and is equal to, or is smaller than, the destination of the packet on an adjacent output line 1200 on the other side. In FIG. 1, the left most line 1200 contains the packet with the lowest destination address.

Batcher describes one acceptable implementation of sorting network 20 in U.S. Pat. No. 3,428,946, issued Feb. 18, 1969. It is, therefore, incorporated by reference herein. Other embodiments are also possible and, to enhance understanding of our invention, FIG. 5 shows an embodiment that has a very simple topology.

Figure 5:
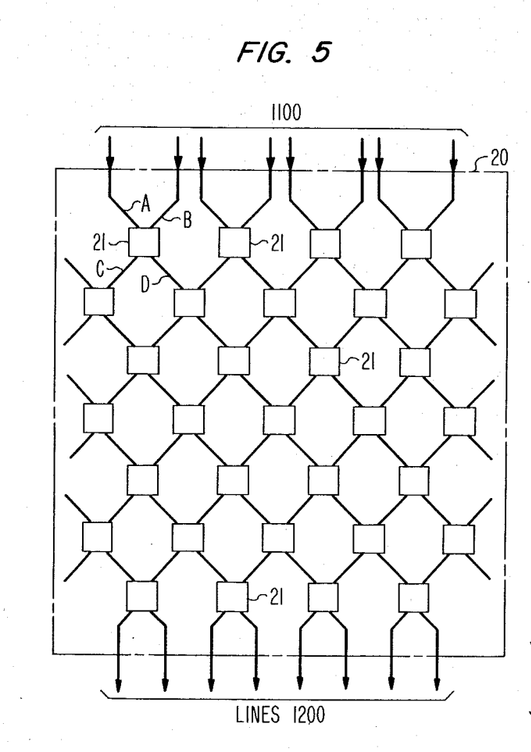
FIG. 5 presents the structure of one conventional embodiment of sorting network 20.

In FIG. 5, sorting network 20 comprises interconnected rows of sorting elements 21. All odd rows of sorting elements 21 contain N/2 sorting elements, rounded up (N is the number of input lines 1100), and all even rows contain (N+1)/2 sorting elements, rounded up. The number of rows of elements 21 is N−1.

Each sorting element 21 has input ports A and B and output ports C and D. When the destination address of the packet at port A is smaller than at port B, a "pass-through" state is assumed by element 21. When the destination address at port A is greater than at port B, the "cross" state is assumed by sorting element 21. Thus, each sorting element 21 sorts its input signals so that the destination addresses of the signals at ports C are always smaller than the destination addresses of the signals at ports D. Sorting over the entire set of inputs is achieved by the successive partial sorting within each row, combined with the interconnection pattern of the rows. That interconnection pattern connects input ports A and B of each row to output ports D and C, respectively, of adjacent sorting elements 21 in the previous row.

It can be observed in FIG. 5, and perhaps it should explicitly be pointed out, that the first and last sorting elements of some rows have one input port not connected to an output port of any other sorting element. When the number of inputs is even, that situation occurs to port A of the first sorting element 21 and to port B of the last sorting element 21 in all even rows. When the number of inputs is odd, that situation occurs for one port of one element in each row. Those idle A ports are provided with a signal having a minimum address, and idle B ports are provided with a signal having a maximum address. Alternatively, sorting elements 21 which receive only one input can be replaced with simple "pass-through" units having one input and one output (e.g., shift registers providing appropriate delay).

Figure 6:
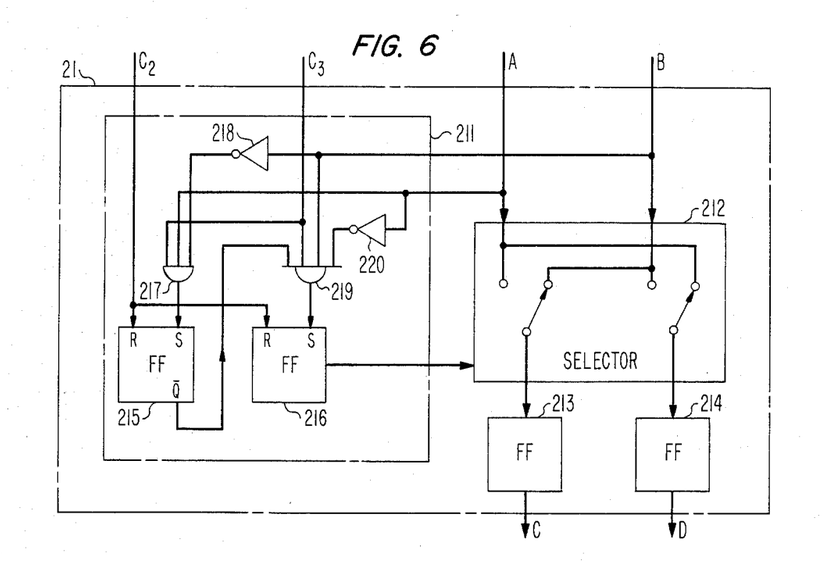
FIG. 6 presents a realization of sorting element 21 within network 20.

FIG. 6 presents an illustrative embodiment of sorting element 21 which, as described earlier, compares the signals at input ports A and B and transfers, or sorts, those signals to output ports C and D in a manner controlled by the comparison results. The comparison is performed in element 211 and the sorting is performed in selector 212 which is an interconnected double-pole/double-throw switch realizable, for example, with AND and OR gates. The sorted signals are reclocked in flip-flops 213 and 214 and applied to output ports C and D, respectively.

The comparison process within element 211 deals with pairs of incoming destination address bits, as they arrive (most significant bit first). Once a "1"-"0" pair is encountered, the comparison process stops because it is then known that the address with the "1" is numerically larger. Since three valid states are possible (no decision, A≧B, and A<B), element 211 contains two flip-flops. Flip-flop 215, under control of AND gate 217 and inverter 218, "sets" on the occurrence of A>B and flip-flop 216, under control of AND gate 219 and inverter 220, "sets" on the occurrence of A<B, providing that flip-flop 215 has not been set. Clock C2 resets flip-flops 215 and 216 at the beginning of the header and clock C3 enables the comparisons during the destination address subfield.

Figure 7:
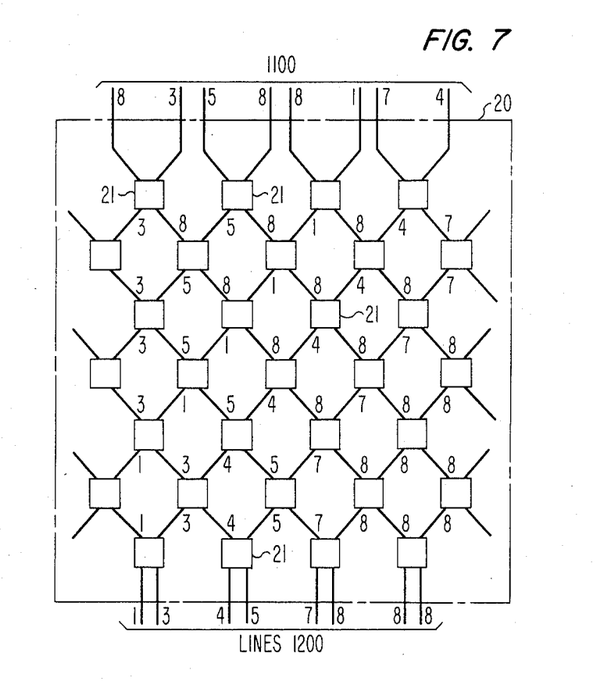
FIG. 7 illustrates the sorting realized in the FIG. 5 sorting network for a specific set of inputs.

To provide further insight into the operation of sorting network 20, FIG. 7 presents an example of a collection of input signals to sorting network 20 and depicts the sorting through each stage. Specifically, FIG. 7 shows the destination addresses at input lines 1100 to be 8, 3, 5, 8, 8, 1, 7, and 4 (where 8 is the destination address at input ports carrying inactive signal packets), and shows output lines 1200 to have the sorted signals in the sequence 1, 3, 4, 5, 7, 8, 8, and 8.

Trap Network 30

Trap network 30 detects the presence of packets that seek a common destination and deactivates and removes all but one of them. In applications where at any one time only one packet can seek connection to a particular destination, trap network 30 is not needed for the proper operation of the system of FIG. 1.

Figure 8:
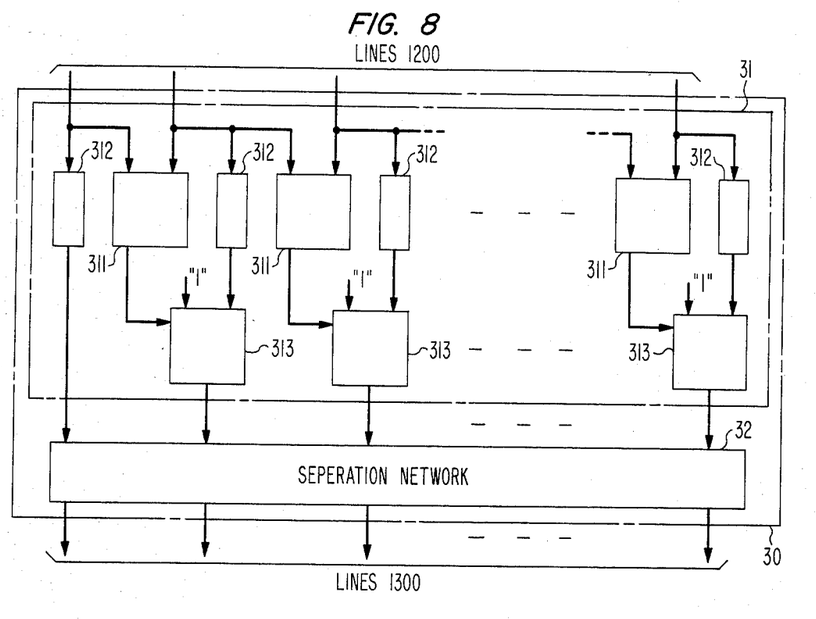
FIG. 8 depicts a block diagram of trap network 30.

A block diagram of trap network 30 is depicted in FIG. 8. It includes an address comparison network 31 responsive to signals applied to the trap network, and separation network 32 responsive to network 31.

For each incoming line, network 31 includes a comparator 311, a delay register 312 and a selector 313. Comparator 311 compares the destination address of the signal at its associated line 1200 to the destination address of the signal at line 1200 to its immediate left. Delay register 312 provides a delay to account for the delay in comparator 311. In one implementation, selector 313 transfers a continuous "1" to its output (in place of the delayed signal) whenever the destination address on the line is equal to the destination address on the line on the left. In another implementation, it can set a "trap" flag in the header, indicating thereby that the packet is a repeat.

Figure 9:
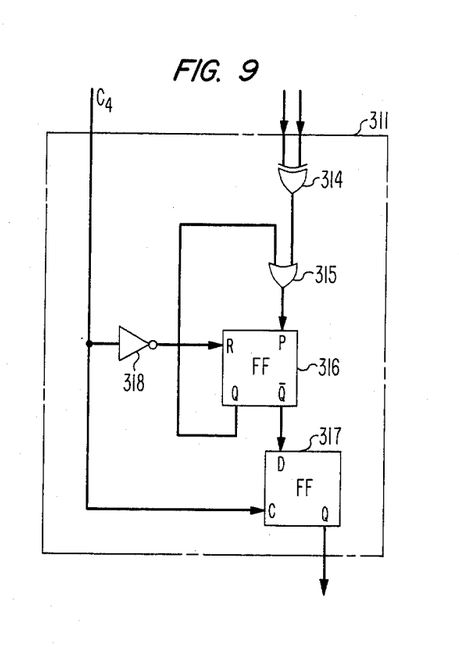
FIG. 9 presents a realization of element 311 within the trap network of FIG. 8.

FIG. 9 depicts one realization for comparator 311. Exclusive OR gate 314, responsive to the two input signals, is connected to OR gate 315. Gate 315 is connected to flip-flop 316 and the Q output of flip-flop 316 is fed back to OR gate 315. Control signal C4 captures the $\bar{Q}$ output of flip-flop 316 in flip-flop 317 and also clears flip-flop 316 through inverter 318. The output of flip-flop 317 is "1" whenever the two inputs to the comparator are equal. The output of comparator 34 controls selector 313. When the output of 311 is a "1", selector 313 sends an inactive packet (input marked "1") to network 32. When output of 311 is a "0", selector 313 permits the signal from its associated delay register 312 to pass through to separation network 31.

Separation network 32 segregates the blank packets generated by comparison network 31 and hence operates much like concentrator 10 using the initial "1" in the stream of "1"s as the activity bit, and can be so implemented. A network like sorting network 20 can also be employed as a separation network. In the alternate implementation mentioned above, the trap flag replaces the activity bit in a network like concentrator 10.

Expander Network 40

In accordance with the principles of our invention, an expander is employed following the sorting network to achieve simultaneous switching of packets to their proper destinations. Numerous means may be devised for achieving this end result, and the following describes three such realizations.

Figure 10:
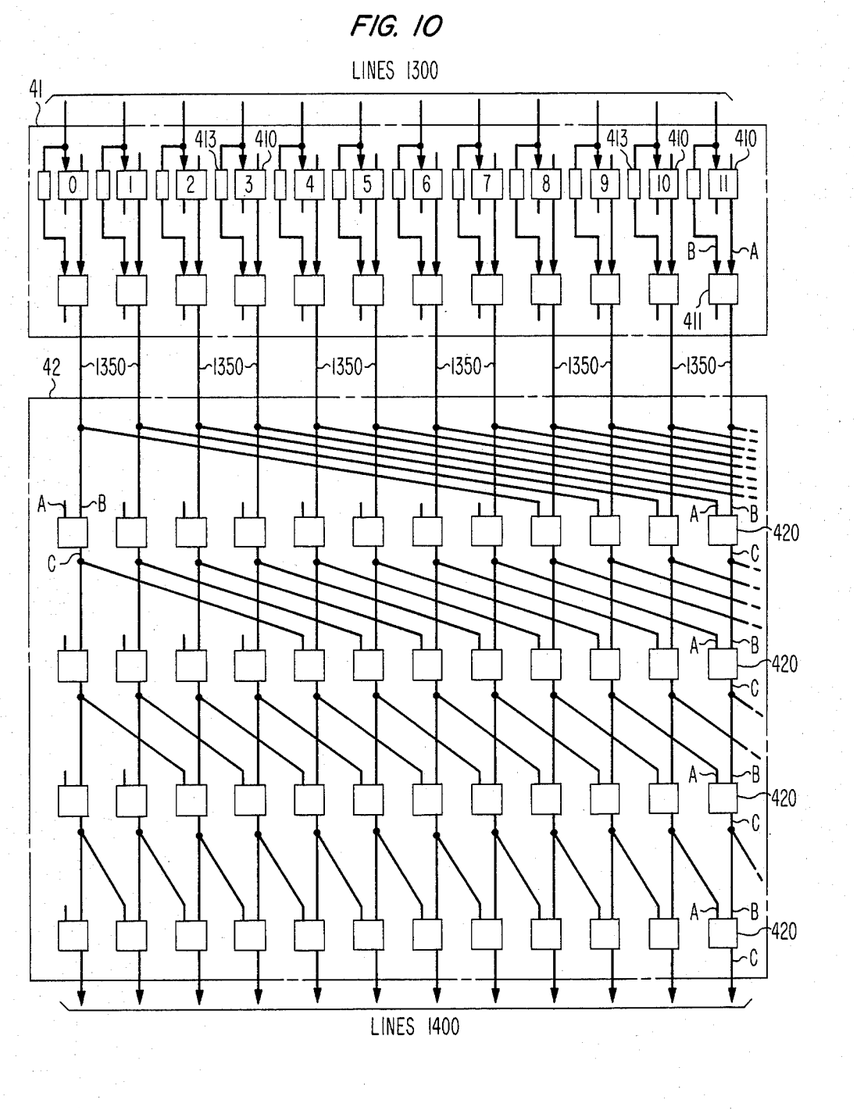
FIG. 10 presents a block diagram implementing expander 40.

Perhaps the simplest to understand is an expander 40 which computes the difference between the destination address of each packet and the intermediate address of the packet within subtracter network 41 and routes the packets in accordance with the computed differences in routing network 42. A block diagram of such an expander is shown in FIG. 10. Subtracter network 41, responsive to the signals on lines 1300, computes the differences between the destination addresses of the packets and the packets' intermediate addresses. Routing network 42, connected to subtracter network 41 via lines 1350, implements the required routing of packets.

Subtracter network 41 includes a row of subtracter elements 410 and a row of selector elements 411. Each subtracter element 410 subtracts a fixed threshold from the destination address of the packets appearing on its associated line 1300. The threshold is equal to the position of the element 410 in the row and, thus, the left most subtracter element 410 in FIG. 10 subtracts the number 0, the next element 410 to the right subtracts the number 1, and so forth. Since the destination address of the packets appear with most significant bit first, subtracter element 410 may conveniently be realized with a first shift register to store the address, a parallel subtracter to subtract the fixed threshold, and a second shift register to send out the result.

Each subtraction result, which is a binary shift control word, is placed in the destination address subfield of its signal packet with the aid of selector element 411. This reduces the number of leads between subtracter network 41 and routing network 42. Each selector 411 is responsive to a subtracter 410 (on input lead A) and to its associated line 1300 (on input lead B), whose signal is delayed with shift register 413. Placement of the subtracter result in the destination address subfield is realized with a conventional single-pole/double-throw switch.

Routing network 42 comprises an array of routing elements 420 arranged in rows and columns. Each routing element 420 has A and B inputs and a C output. For illustrative purposes, FIG. 10 depicts twelve columns and four rows but, generally, the number of rows is equal to $\log_2 N$, rounded up, where N is the number of input lines 1350.

Each row of routing elements 420 is arranged to execute the shift dictate of a specific bit in the shift control word of the packets (in the destination address subfield) on lines 1350. In order to avoid blocking, the first row of elements 420 is arranged to execute the shift dictated by the most significant bit in the shift control word, the second row of elements 420 is arranged to execute the shift dictated by the next most significant bit, etc.

The specific interconnection of routing elements 420 follows an algorithm which defines the connection of routing elements 420 in each row to routing elements 420 in the preceding row. Specifically, routing element 420 in row i and column j (sequencing from 1) has its A input connected to output C in column $j-k$ of the previous row and its B input connected to output C in column j of the previous row. The index k equals $2^{M-i}$ and M is the number of rows in network 42. Inputs for which a connection is not defined by the above algorithm (e.g., whose j index falls outside the range $1 \leq j \leq M$) receive a "1" input.

Since each element 420 has a single output which is connected to two different elements 420 in the following row, an output signal that is targeted, or directed, to one element 420 also appears at another element 420. Conversely, the signal at each input of routing element 420 can be an empty packet, an active packet targeted for the routing element, or an active packet that is not targeted for the routing element.

Figure 11:
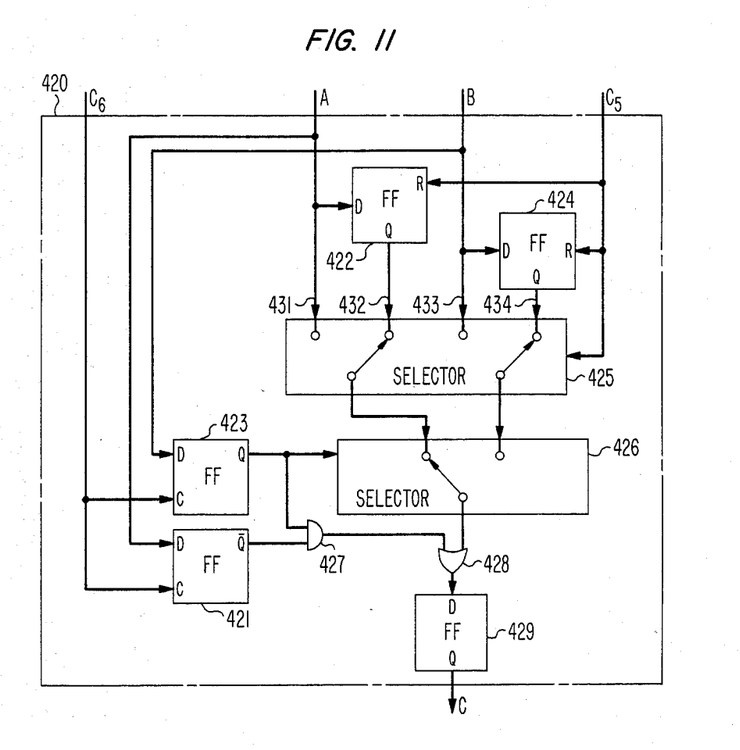
FIG. 11 presents a realization of switch element 420 of the expander depicted in FIG. 10.

FIG. 11 illustrates one embodiment of routing element 420. Therein, input A is connected to flip-flop 421, to flip-flop 422 and to input 431 of selector 425. Input B is connected to flip-flop 423, to flip-flop 424 and to input 433 of selector 425. The outputs of flip-flops 422 and 424 are connected to inputs 432 and 434 of selector 425, respectively. Selector 425 is a double-pole/double-throw switch. Flip-flops 422 and 424 combine with selector 425 to insure that at all stages of network 42 the required control bit for each element 420 immediately follows the activity bit. With the aid of control signal C5 applied to flip-flops 422 and 424 and to selector 425, that is achieved by deleting from the shift control words the bit following the activity bit at inputs A and B, advancing the remaining bits in the shift control words by one clock period (relative to the activity bit), and compensating for the deleted bits by adding a "0" at the end of the destination address subfields. The "0" is added by resetting flip-flops 422 and 424 during the advancement period. The deleted bits, which are the current most significant bits of the shift control words, are concurrently captured in flip-flops 421 and 423 with the aid of control signal C6. Selector 426, a single-pole/double-throw switch responsive to selector 425, performs the routing of switch 420 under control of flip-flop 423. Input B is selected when the captured most significant bit in flip-flop 423 is a "0", input A is selected when input B is not selected and the captured most significant bit in flip-flop 421 is a "1", and a "1" is developed when neither input A nor input B are selected. This logic is achieved with AND gate 427 responsive to the true output of flip-flop 423 and to the inverse output of flip-flop 421 and OR gate 428 responsive to gate 427 and selector 426. The output signals of gate 428 are reclocked in flip-flop 429 before exiting element 420.

Figure 12:
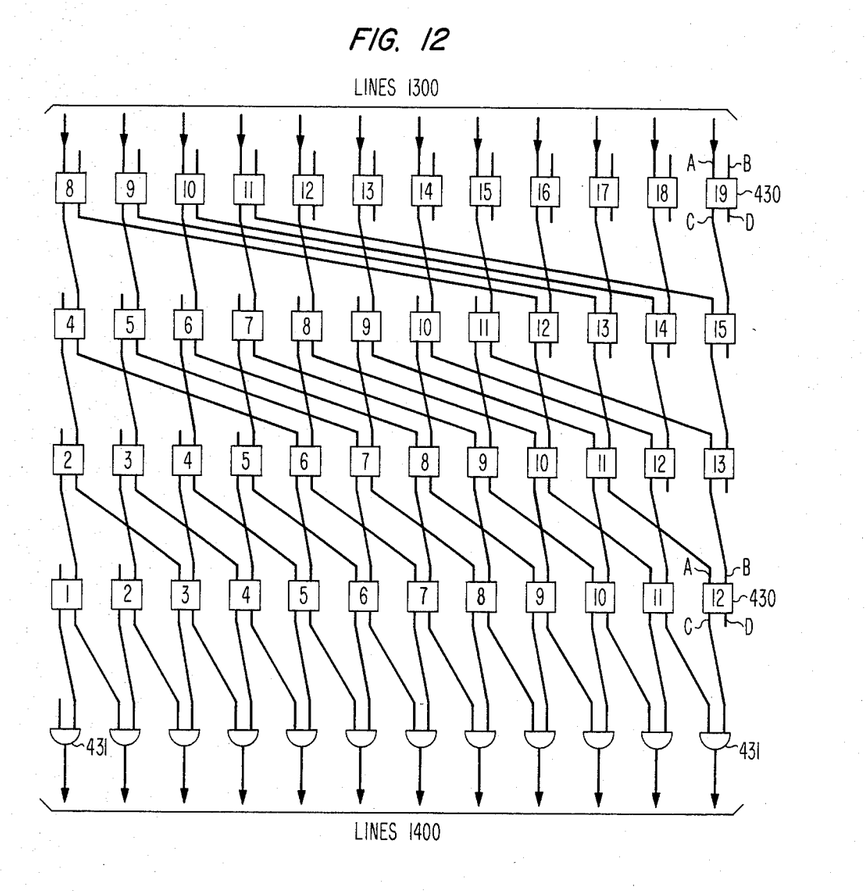
FIG. 12 presents a block diagram of a second realization of expander 40.

The second illustrative embodiment of expander 40 combines the subtraction operation of network 41 with the routing operation of network 42. The interconnection structure of this expander, shown in FIG. 12, is almost identical to that of routing network 42 but the interconnected elements (elements 430) perform both a comparison function (which replaces the subtraction function in the previous embodiment) and the routing function. Each element 430 has A and B inputs and C and D outputs. An active signal at input A (a "0" activity bit) causes input A to be selected and an inactive signal at input A (a "1" activity bit) causes input B to be selected. A threshold value is then compared to the selected signal. Each element 430 compares a different threshold value but all elements act identically on the result. Namely, if the destination address is equal to or larger than the threshold, the signal is routed to output D (to the right); otherwise, it is propagated to output C (downward). The output to which a signal is not routed receives a stream of "1"s. The threshold number of an element 430 in any row is one greater than the threshold number of the element 430 to its left. The threshold numbers of the left most elements 430 (first column of elements 430) form the sequence 1, 2, 4, 8, ..., starting with the last row. Following the last row of elements 430, a row of AND gates 431 combines the C output of each element 430 with the D output of the element on its left. Implementation of elements 430 parallels the conventional flip-flop and gate implementations of elements 420.

Figure 13:
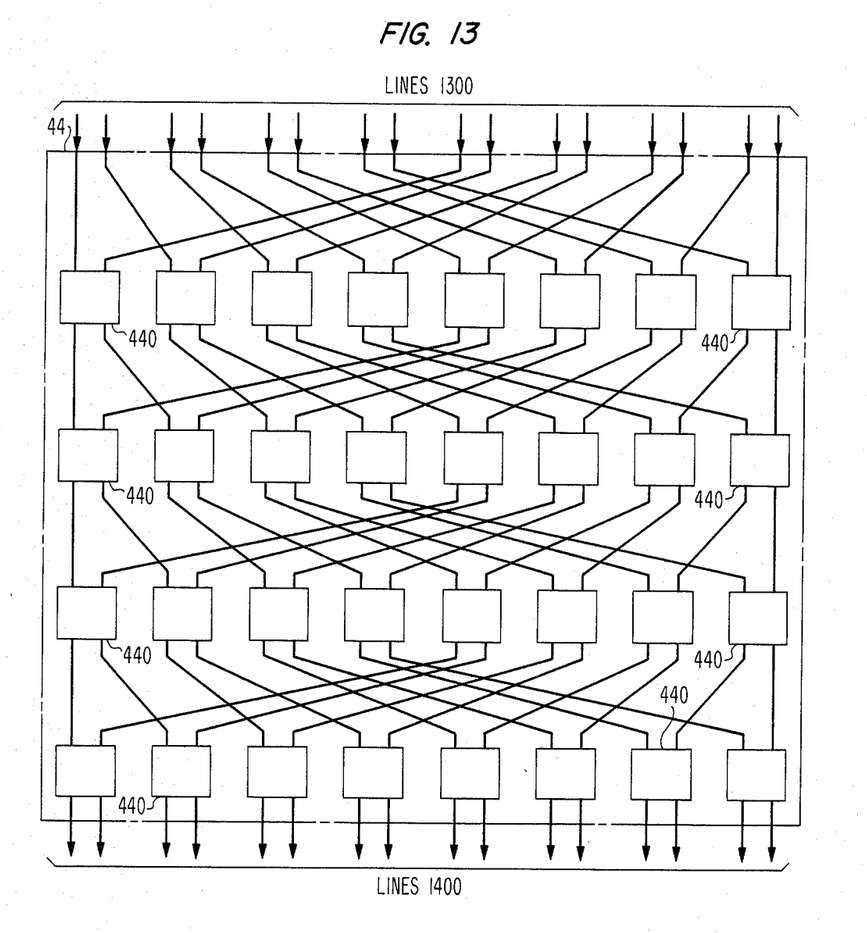
FIG. 13 presents a block diagram of a third realization of expander 40.

The third illustrative embodiment of expander 40, based on the Omega shuffle network described by D. H. Lawrie, employs a shuffle network 44 as shown in FIG. 13. Network 44, like network 13, comprises rows of switching elements (here, elements 440) interconnected in a shuffle pattern with the number of input lines being a power of 2. While network 13 responds to shift control signals that arrive with least significant bit first, network 44 responds to destination addresses that arrive with the most significant bit first. Because of this difference, Network 44 is an inverse of network 13 and it is obtainable by merely turning network 13 "upside down". The interconnection pattern between rows of elements 440 is defined as it is defined in connection with network 13, but here $s_1s_2s_3s_4$ in one row connects to $s_2s_3s_4s_1$ in the next row. The top row in network 44 responds to the most significant bit of the destination addresses and following rows respond to subsequent address bits.

Switching elements 440 can be identical to switching elements 130 if the destination addresses are separated from their associated packets. It is simpler, however, to use a switching element 440 which operates on undisturbed packets. One embodiment for switch 440 is shown in FIG. 14.

Figure 14:
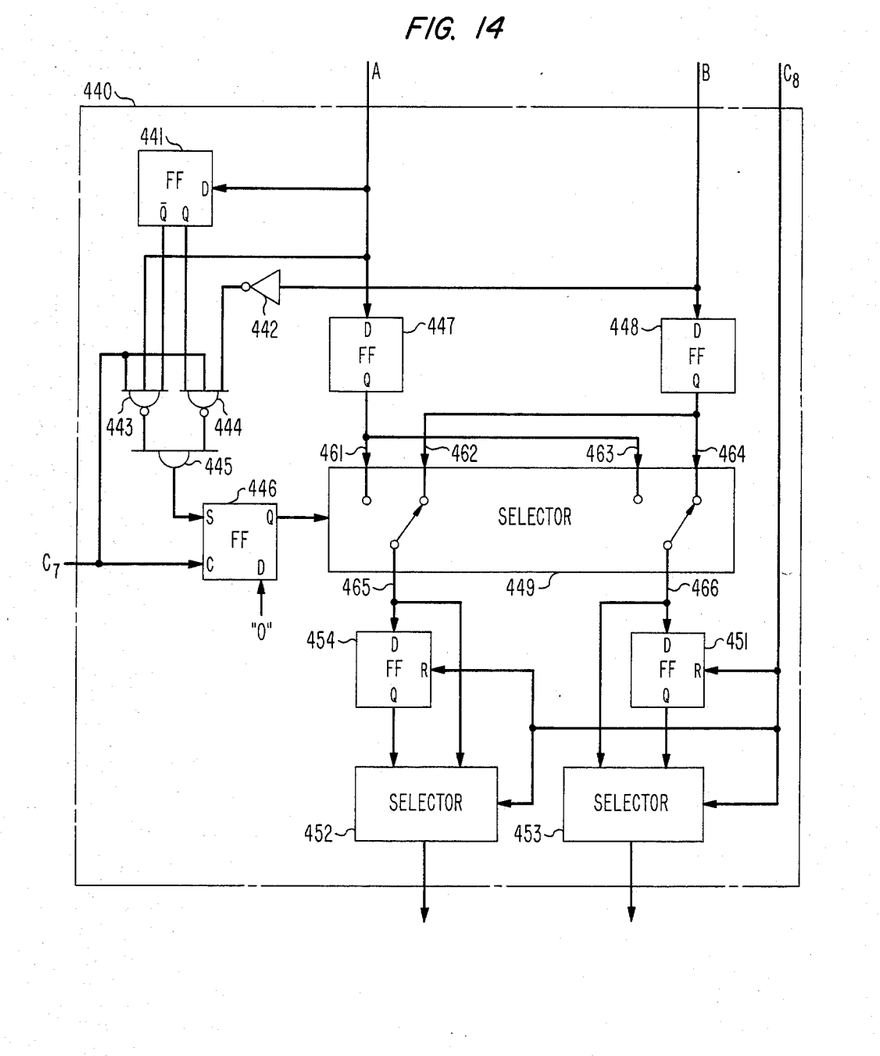
FIG. 14 illustrates one implementation of switch element 440.

In FIG. 14, flip-flop 441 and gates 442 through 445 are interconnected to develop a switch control signal that responds to the activity bit on input A and the current most significant bits on both inputs A and B. The developed signal is applied to the "set" input of flip-flop 446 into which a "0" is clocked with control signal C7 just prior to it being set by gate 445 (if conditions are right). Gates 443–445 are enabled only during the clock period when the appropriate control bits are at the A and B inputs (i.e., immediately following the activity bit). The input A signal is reclocked in flip-flop 447 and applied to inputs 461 and 463 of selector 449. The input B signal is reclocked in flip-flop 448 and applied to inputs 462 and 464 of selector 449. Selector 449 is a conventional double-pole/double-throw switch. Output 465 is connected to flip-flop 454 and to a first input of selector 452, while output 466 is connected to flip-flop 451 and to a first input of selector 453. Flip-flops 454 and 451 are connected to a second input of selectors 452 and 453, respectively; and all four elements (451–454) are under control of signal C8. As in connection with elements 420, each flip-flop selector combination deletes the bit following the activity bit and inserts a "0" at the end of the destination address subfield.

Control Block 50

Because of the self routing architecture of the FIG. 1 system control block 50 needs to provide very few control signals. The needed control signals for each one of the networks can be generated in a separate circuit and the circuits can be activated in a pipe-line fashion, with each network "telling" the next network when a new packet begins. By way of example, FIG. 15 illustrates an embodiment for control block 50 adapted to control the FIG. 1 system with a shuffle network realization for concentrator 10 and expander 40.

Figure 15:
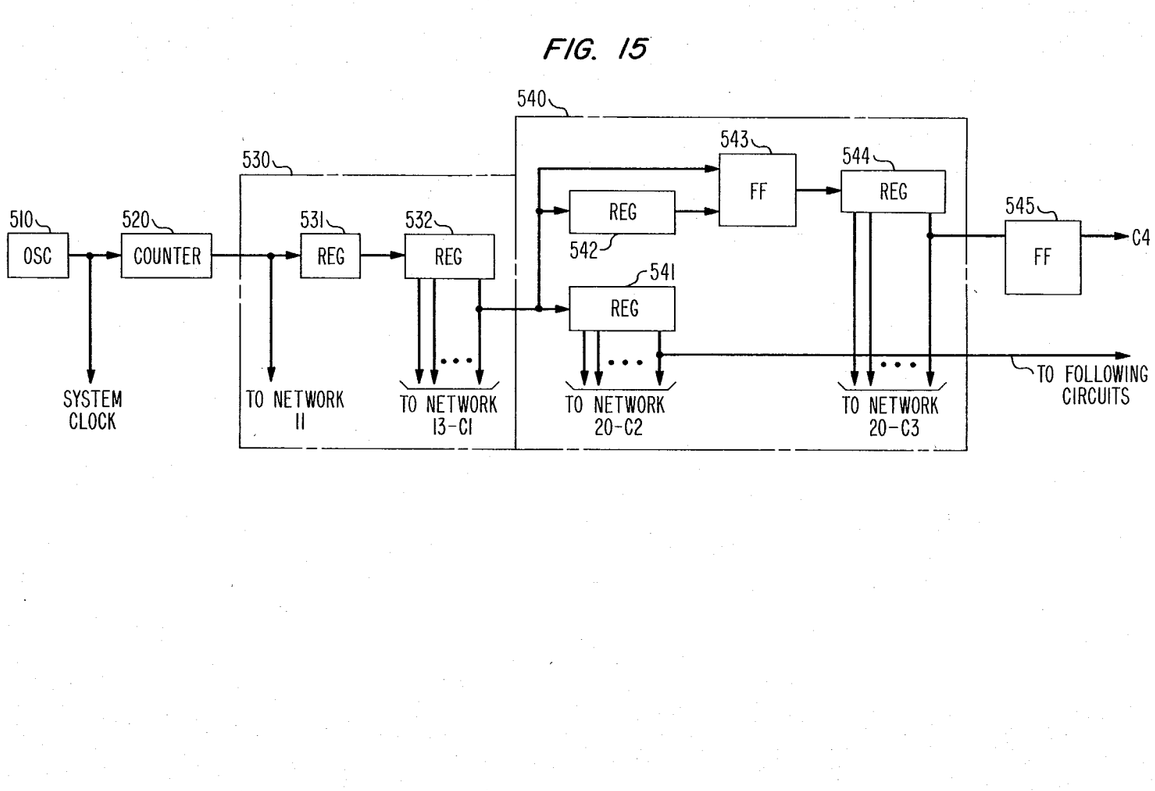
FIG. 15 depicts control block 50.

In FIG. 15, oscillator 510 provides the system clock, and counter 520 counts down the system clock to develop the packet rate. The output of counter 520 is a one clock period pulse which precedes the activity bit at the input to concentrator 10 by one clock period. Counter 520 feeds element 530, which develops the control signals for networks 11 and 13 in concentrator 10. Network 11 requires a pulse preceding the activity bit to reset the adders. That pulse is provided by the signal of counter 520 directly. Following a delay in adder network 11, routing network 13 accepts the signals on lines 115 and 116 and requires a control signal C1 (FIG. 4) for each row of switching elements 130. The set of control signal C1 is developed with delay register 531 responsive to counter 520 and tapped shift register 532 connected to register 531.

The output of routing network 13 is applied to sorting network 20, wherein sorting elements 21 require control signals sets C2 and C3. Signal C2 is a one clock period pulse coinciding with the activity bit, while signal C3 is an address comparison enabling pulse which spans the width of the destination address subfield. Signal sets C2 and C3 are generated within element 540 in FIG. 5, with register 541 developing the signal set C2 and delay register 542, flip-flop 543 and register 544 developing the signal set C3.

Elements 311 in trap network 30 require a control signal C4 which resets flip-flops 316 at times other than the destination address subfield. This signal is obtained by delaying the last output of register 544 with flip-flop 545.

In the shuffle network embodiment of expander 40, network 44 requires control signals that are essentially the same as the control signals for concentrator 10. Since the circuitry for such control signals has already been described in connection with element 10 it is not described again.

What is claimed is:

1. A switching network having a plurality of output ports with unique numerical designations, said switching network being responsive to simultaneously applied signals and each of said input signals containing one of said numerical designations to specify a particular one of said output ports to which said each input signal is to be switched, comprising:
    a sorting network, responsive to said applied input signals, for sorting said applied input signals in ascending order of said contained numerical designations, forming thereby a sorted signal set; and
    means, responsive to said numerical designations embedded in said sorted signal set, for switching each signal of said sorted signal set to the particular one of said output ports specified by said numerical designation contained in said each signal.

2. A switching network having a plurality of output ports with unique numerical designations, said switching network being responsive to simultaneously applied input signals and each of said active input signals containing one of said numerical designations to specify a particular one of said output ports to which said each input signal is to be switched, comprising:
    a sorting network, responsive to said applied input signals, for sorting said applied input signals in ascending order of said contained numerical designations, forming thereby a sorted signal set;
    a trap network responsive to said sorted set for detecting occurrences where more than one signal in said sorted signal set contains the same one of said numerical designations and, and for each such occurrence, removes all but one of said sorted set signals; and
    an expander network, responsive to output signals of said trap network, for routing each signal of said sorted signal set to the particular one of said output ports specified by said numerical designation contained in said each signal.

3. A switching network having a plurality of output ports with unique numerical designations, said switching network being responsive to simultaneously applied input signals, some or all of which are active, and those of said active input signals containing one and only one of said numerical designations to specify a particular one of said output ports to which said each input signal is to be switched, comprising:
    a concentrator, responsive to said applied input signals, for segregating said applied input signals with means for routing said active signals to appear adjacent to each other at output terminals of said concentrator;
    a sorting network, connected to said output terminals of said concentrator, for sorting input signals of said sorting network in ascending order of said contained numerical designations, forming thereby a sorted signal set; and
    an expander network, responsive to said sorted signal set, for routing each signal of said sorted signal set to the particular one of said output ports specified by said numerical designation contained in said each signal.

4. A switching network having a plurality of output ports with unique numerical designations, said switching network being responsive to simultaneously applied input signals, some or all of which are active, and those of said active input signals containing one of said numerical designations to specify a particular one of said output ports to which said each input signal is to be switched, comprising:
    a concentrator, responsive to said applied input signals, for segregating said applied input signals with means for routing said active signals to appear adjacent to each other at output terminals of said concentrator;
    a sorting network, connected to said output terminals of said concentrator, for sorting input signals of said sorting network in ascending order of said contained numerical designations, forming thereby a sorted signal set; and
    a trap network responsive to said sorted set for detecting occurrences where more than one signal in said sorted signal set contains the same one of said numerical designation and, and for each occurrence, deactivates all but one of said sorted set signals; and
    an expander network, responsive to output signals of said trap network, for routing each signal of said sorted signal set to the particular one of said output ports specified by said numerical designation contained in said each signal.

5. The switching network of claim 1 wherein said means for routing includes means for steering each signal of said sorted signal set in accordance with both the position of said each signal within said sorted signal set and said numerical designation contained in said each signal.

6. A self-routing switching network responsive to a simultaneously applied plurality of input signals, which switching network is adapted to simultaneously transfer each of said input signals to a specific one of a plurality of output ports as determined by an output port destination signal embedded in each of said input signals, comprising:
    a sorting network responsive to said input signals for simultaneously sorting said input signals in order of increasing output port destinations, developing thereby a sorted signals set that is applied to output ports of said sorting network; and means, responsive to said embedded output port destinations of said sorted signals set for simultaneously switching each signal of said sorted signals set from the output port of said sorting network at which it appears to the output port of said switching network specified by said output port destination signal embedded in said sorted signal.

7. A switching network comprising:

a sorting network having a plurality sorting network input ports serving as input ports of said switching network and a plurality of sorting network output ports designated 1 through N, and an expander network having a plurality of expander network input ports designated 1 through N, connected to said sorting network output ports of like designations, and expander network output ports designated 1 through M, serving as output ports of said switching network; wherein (a) said sorting network input ports are responsive to simultaneously applied input signals of said switching network, each of said input signals containing a destination address less than or equal to M which corresponds to the particular one of said expander network output ports to which said each of said input signals seeks to be applied;

(b) said sorting network sorts said input signals in ascending order of said destination addresses, applies the input signal with the lowest destination address to the sorting network output port having the designation 1, and applies signals with destination addresses of successively larger numerical value to sorting network output ports having designations of successively larger numerical value; and (c) said expander network simultaneously accounts for instances where more than one of said signals applied to its inputs contains the same destination address by altering all but one of said signals destined to any address and steers each of the unaltered signals applied to its input ports, under control of said destination address contained in said each of the signals, to the output port of said expander network having a designation equal to said destination address.

8. The switching network of claim 2 wherein said expander includes means for performing said routing of said each signal of said sorted signal set based on the difference between said numerical destination contained in said each signal and the position of said each signal within said sorted signal set.

9. The switching network of claim 2 wherein said expander network comprises switching elements that compare a threshold value to said numerical designation of signals applied to said switching elements and route said signals based on said comparison.

10. The switching network of claim 2 wherein said expander network comprises switching elements that inspect the numerical designation of signals applied to said switching elements and route said signals based on said inspection.

11. The switching network of claim 2 wherein said trap network comprises:

an address comparison network, responsive to input signals of said trap network, including means for comparing said numerical designations of adjacent ones of said input signals to said trap network;

means for deactivating input signals to said trap network based on said comparisons in said address comparison network; and means for separating signals that have been deactivated from those signals that have not been deactivated.

12. A network for switching input signals having embedded output port destination designations to the designated output port destinations and including a sorting network, responsive to said input signals; the improvement comprising:

an expander network responsive to sorted output signals of said sorting network, for switching input signals applied to said expander to output ports designated by said input signals and routing no input signals to output ports not designated by said input signals.

13. The network of claim 12 wherein said expander comprises:

first means for comparing said output port destination designation of said each sorted input signal to the input port of said expander at which said each sorted input signal is found, developing thereby a shift control signal for said each sorted input signal; and second means for routing said each sorted input signal to said output port destination based on said shift control signal developed for said each sorted input signal.

14. The network of claim 12 wherein said expander comprises routing elements having inputs A and B and outputs C and D, which routing elements are interconnected in a matrix of rows and columns, with the routing element in row i and column j having its A input connected to output C of the routing element in row $i-1$ and column $j-k$ (where k equals $2^{M-i}$ and M is the number of rows in said matrix) and its B input connected to output D in row $i-1$ and column j; and said routing element are arranged to select active signals at said A input in preference to active signals at said B input, to compare said output port destination designation of said selected active signal to a predetermined threshold and to route said selected signal to one of its outputs based on said comparing.

15. The network of claim 12 wherein said input signals applied to said expander are signal packets and each packet contains an activity bit and control word bits, and wherein said expander comprises:

an omega network with switching elements having two inputs and two outputs, where each switching element assumes the "pass" state under input conditions $\overline{AC}+A\overline{B}D$ and assumes the "cross" state under input conditions $\overline{AC}+A\overline{BD}$, where A represents the activity bit at a first input of said switching element, B represents the activity bit at the second input of said switching element, C represents the control word bit at said first input of said switching element, and D represents the control word bit at said second input of said switching element.

* * * * *